US007694325B2

(12) United States Patent
Martin et al.

(10) Patent No.: US 7,694,325 B2
(45) Date of Patent: Apr. 6, 2010

(54) INFORMATION BROADCASTING SYSTEM

(75) Inventors: Hardison G. Martin, Louisville, KY (US); Kenneth A. Tench, Louisville, KY (US); Anthony W. Simpson, Goshen, KY (US); John D. Johnson, Louisville, KY (US)

(73) Assignee: Innovative Electronic Designs, LLC, Louisville, KY (US)

( * ) Notice: Subject to any disclaimer, the term of this patent is extended or adjusted under 35 U.S.C. 154(b) by 2057 days.

(21) Appl. No.: 10/066,420

(22) Filed: Jan. 31, 2002

(65) Prior Publication Data

US 2003/0143944 A1 Jul. 31, 2003

(51) Int. Cl.
*H04N 7/16* (2006.01)
*G06F 3/00* (2006.01)
*H04M 11/04* (2006.01)
*H04H 20/71* (2008.01)

(52) U.S. Cl. ...................... 725/143; 725/145; 715/730; 715/731; 379/37; 455/3.01

(58) Field of Classification Search ...................... None
See application file for complete search history.

(56) References Cited

U.S. PATENT DOCUMENTS 4,701,862 A * 10/1987 Washizuka et al. .......... 704/274
5,612,869 A * 3/1997 Letzt et al. ...................... 705/3
5,801,685 A * 9/1998 Miller et al. ................ 715/202
5,913,912 A 6/1999 Nishimura et al.
5,970,459 A 10/1999 Yang et al.
6,003,009 A 12/1999 Nishimura
6,163,647 A 12/2000 Terashima et al.
6,188,731 B1 2/2001 Kim
6,188,830 B1 2/2001 Mercs et al.
6,249,319 B1 6/2001 Post
6,262,776 B1 7/2001 Griffits
6,343,212 B1 * 1/2002 Weber et al. ............. 455/404.1
6,385,568 B1 * 5/2002 Brandon et al. ................ 704/7
6,714,909 B1 * 3/2004 Gibbon et al. .............. 704/246
2002/0062349 A1 * 5/2002 Maehiro et al. ............. 709/206
2002/0087555 A1 * 7/2002 Murata ......................... 707/10
2002/0198716 A1 * 12/2002 Zimmerman ................ 704/270

FOREIGN PATENT DOCUMENTS

EP 0848383 A2 6/1998

OTHER PUBLICATIONS

Barbara Cook, Airport Signage—A Package Deal?, Airport Magazine, Jun. 13, 2001.
Barbara Cook, Signs of the Times The FutureComes to Airport Signage, Airport Magazine, Jun. 13, 2001.

* cited by examiner

*Primary Examiner*—Christopher Kelley
*Assistant Examiner*—Justin E Shepard
(74) *Attorney, Agent, or Firm*—James C. Eaves, Jr.; Greenebaum Doll & McDonald PLLC; Brian W. Chellgren

(57) ABSTRACT

The instant invention provides a system and method of broadcasting audio and visual information to a plurality of audio reproduction devices and visual display devices utilizing a plurality of control computers linked thereto by a communications network. The invention employs a plurality of prerecorded digital audio files and corresponding visual representation thereof to allow a user to construct message sequences for broadcast with a minimum of system input. Furthermore, a user may specify a plurality of broadcast zones to broadcast audio and visual messages.

18 Claims, 5 Drawing Sheets

INFORMATION BROADCASTING SYSTEM

BACKGROUND

Publicly accessible areas are often equipped with broadcasting systems having both audio and video components for disseminating information to the general public. For example, museums, shopping centers, train stations, bus stations, airports, and even grocery stores now have video displays and accompanying audio systems that not only inform those nearby, but also present advertising banners or the like. In transportation centers, automated video displays and audio announcements are a necessity for informing travelers of arrival and departure times, paging messages, emergency announcements, gate or terminal changes, and a host of other messages necessary to facilitate efficient travel.

Prior art systems for generating and displaying audio and video messages often rely on "off the rack" audio and video controllers to generate and send signals to various broadcast and display devices. For example, airports are equipped with numerous video displays that display flight numbers, departure and arrival gates, schedules, and the current time. Many of these prior art video systems are equipped with complementary audio systems that broadcast messages of import to an area or zone within the airport terminal.

When a flight schedule is modified a video display device displaying information for multiple flights will often simply change the affected flight information on the display. Sometimes a concomitant audio announcement is made to inform passengers that a particular flight has been affected. The audible and visual indices of flight information changes are not necessarily synchronized. Additionally, in many cases, courtesy and emergency announcements or messages are broadcast only through the audio portion of the system, as most display systems are not equipped to display courtesy announcements. This is a particularly vexing problem for hearing-impaired patrons, as they are extremely difficult or even impossible to reach by page, even in an emergency situation.

Furthermore, even when video displays are capable of displaying courtesy announcements in a visual format such as text, most prior art displays do not provide for synchronization of the visual message display with a concomitant audio portion. Currently, the Americans with Disabilities Act contemplates that audio and video be synchronized for maximum effectiveness in serving patrons.

SUMMARY OF THE INVENTION

The instant invention obviates the aforementioned problems by providing a system and method for broadcasting synchronized audible and visual information having a plurality of control computers linked by a digital communications network to a plurality of visual displays capable of displaying textual information. A plurality of speakers or other sound reproduction devices are connected to a central computer for broadcasting audio messages to a plurality of locations.

The system uses a plurality of pre-recorded and stored audio message components and corresponding text components to assemble customized messages to be broadcast both audibly and visually. The messages may be constructed by a user by supplying message variables by typing a series of alphanumeric characters through a microphone station having a keypad and a visual display. Messages can also be generated by typing the text thereof using a conventional microcomputer and keyboard or in concert with a microphone station. Furthermore, the instant invention employs a plurality of loudspeakers and visual displays that may be addressed either separately or in specified broadcast groupings, thereby allowing messages to be broadcast in a plurality of broadcast zones throughout a given coverage area. In this fashion, messages can be played locally or in widespread areas depending upon the user's preference.

Furthermore, the instant invention provides the ability to play audio and visual message components synchronously, thereby alerting the intended recipient of a message through the use of two senses, sight and hearing. Since messages are constructed from pre-recorded components, the time required for audio playback of each component of a message is measured and included with visual representation of the audio (text). Thus a computer can time the display of visual messages with the broadcast of the corresponding audio, as required by the Americans with Disabilities Act.

The invention employs a database server, or a plurality thereof, to store tables of information to be displayed on the system and further allows for flexible configuration of information to be displayed and broadcast to a plurality of discrete broadcast zones. This feature of the instant invention allows the user of the system to customize differing subsets of information or messages to be displayed and broadcast to plurality of broadcast zones thereby making it particularly suitable for use in, for example, an airport or train station where schedule information must be conveyed to a plurality of concourses, platforms, gates, or terminals.

Furthermore, the system of the instant invention provides a user with the ability to modify information stored in an information database from a plurality of locations throughout the broadcast area simply by keying alphanumeric characters into a microphone station. This feature of the instant invention allows a user to generate a new audio and video announcement or message, modify the information database, and modify any video displays affected by the changed information, based on it's specified broadcast zone. Since any information that is broadcast using the invention is first entered into a database, a user may readily track, store, and retrieve previously broadcast messages and regularly update the information contained in the database.

The system also includes a feature that allows for automated sequencing of messages that is particularly advantageous in the travel industry when boarding planes, busses, trains and the like. An agent or user simply initiates a message sequence, for example a flight boarding sequence, and the system of the instant invention assembles and broadcasts boarding announcements in a predetermined sequence based on variables supplied by the agent or resident in the information database.

Therefore, it is an object of the present invention to provide a system and method for broadcasting audible and visual information.

It is a further object of the instant invention to allow a user to construct a plurality of messages to be broadcast audibly without requiring an audio recording thereof.

It is a further object of the instant invention to create and broadcast a plurality of audio and visual messages by assembling a plurality of pre-recorded message components.

It is a further object of the instant invention to provide for synchronous broadcast of both audio and visual information in a plurality of areas simultaneously.

It is a further object of the instant invention to provide continuous audible and visual information updates to a plurality of predetermined broadcast zones.

It is a further object of the instant invention to provide a user the ability to access and modify an information database that supplies information to an audio and visual broadcast system.

It is a further object of the instant invention to enable message broadcasting to a plurality of user defined broadcast zones.

Other objects and advantages of the instant invention will be apparent after reading the detailed description of the preferred embodiments, taken in conjunction with the accompanying drawing figures.

DETAILED DESCRIPTION OF THE PREFERRED EMBODIMENT(S)

Figure 1:
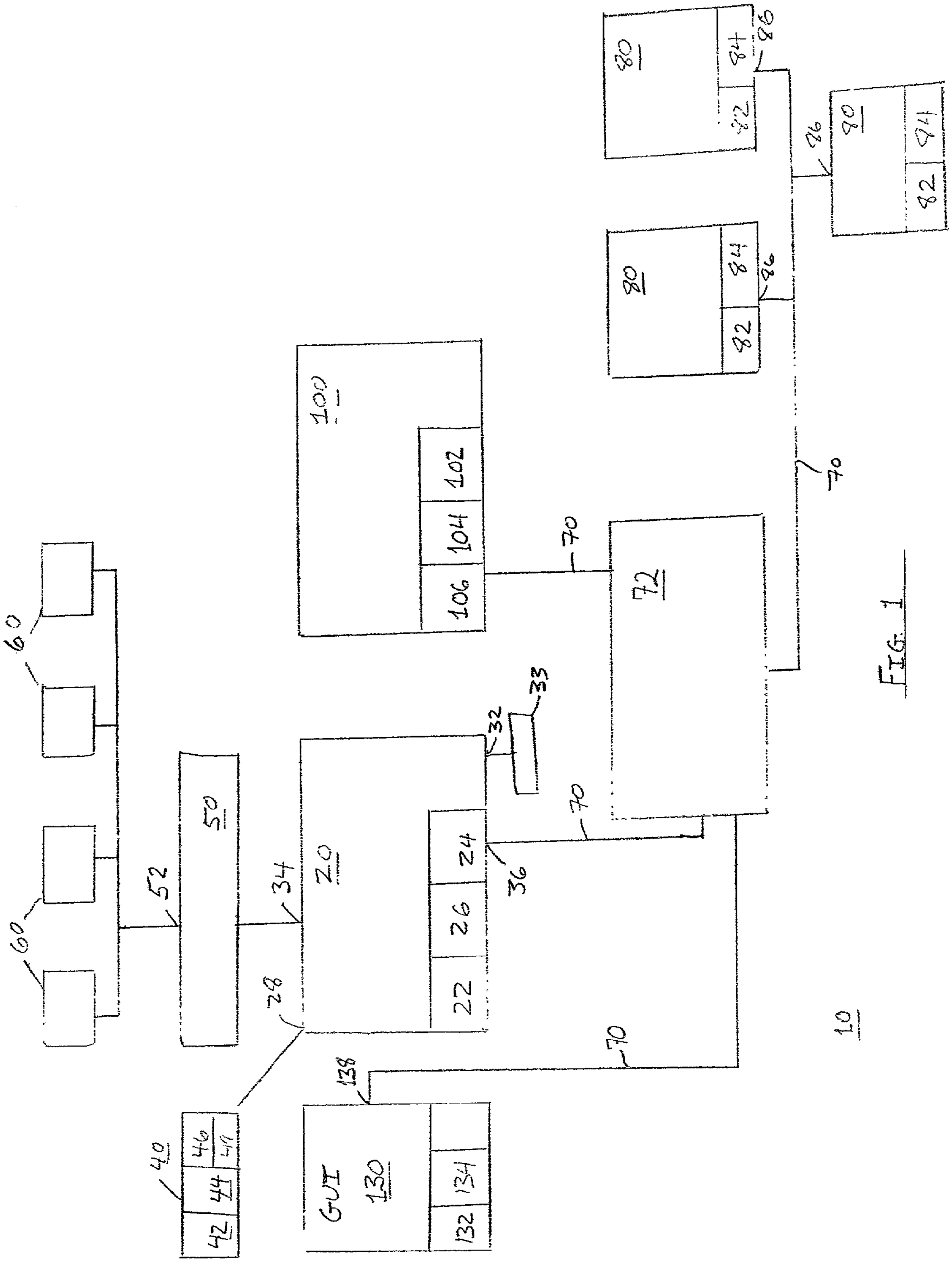
FIG. 1 is a block diagram of the system of the instant invention.
Figure 2:
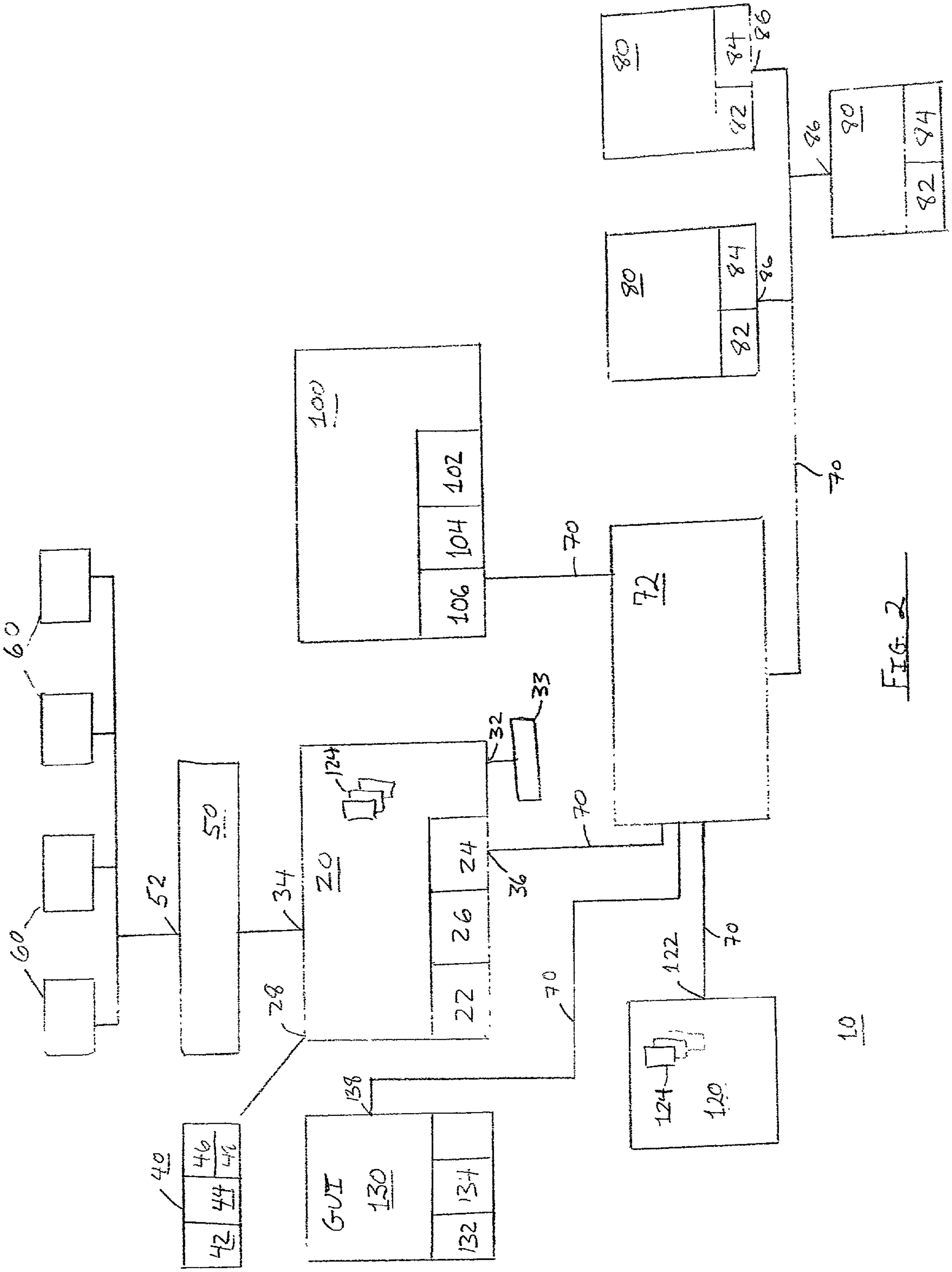
FIG. 2 is a block diagram of the system of the instant invention.

Referring to drawing FIGS. 1 and 2, and in accordance with a preferred constructed embodiment of the instant invention, a system 10 for broadcasting synchronized audio and visual information comprises a central control computer 20 for recording both audio message components and visual message components, and saving the message components or 'takes' as digital files. The central control computer 20 generally comprises a microprocessor 22, system memory 24, and a system bus 26 that couples the microprocessor 22 to the memory 24, as is well known to one of ordinary skill in the art. The central control computer 20 has at least one input 28 electrically connected to at least one microphone station 40, and accepts and digitizes an electrical signal therefrom using an analog to digital converter.

Figure 3:
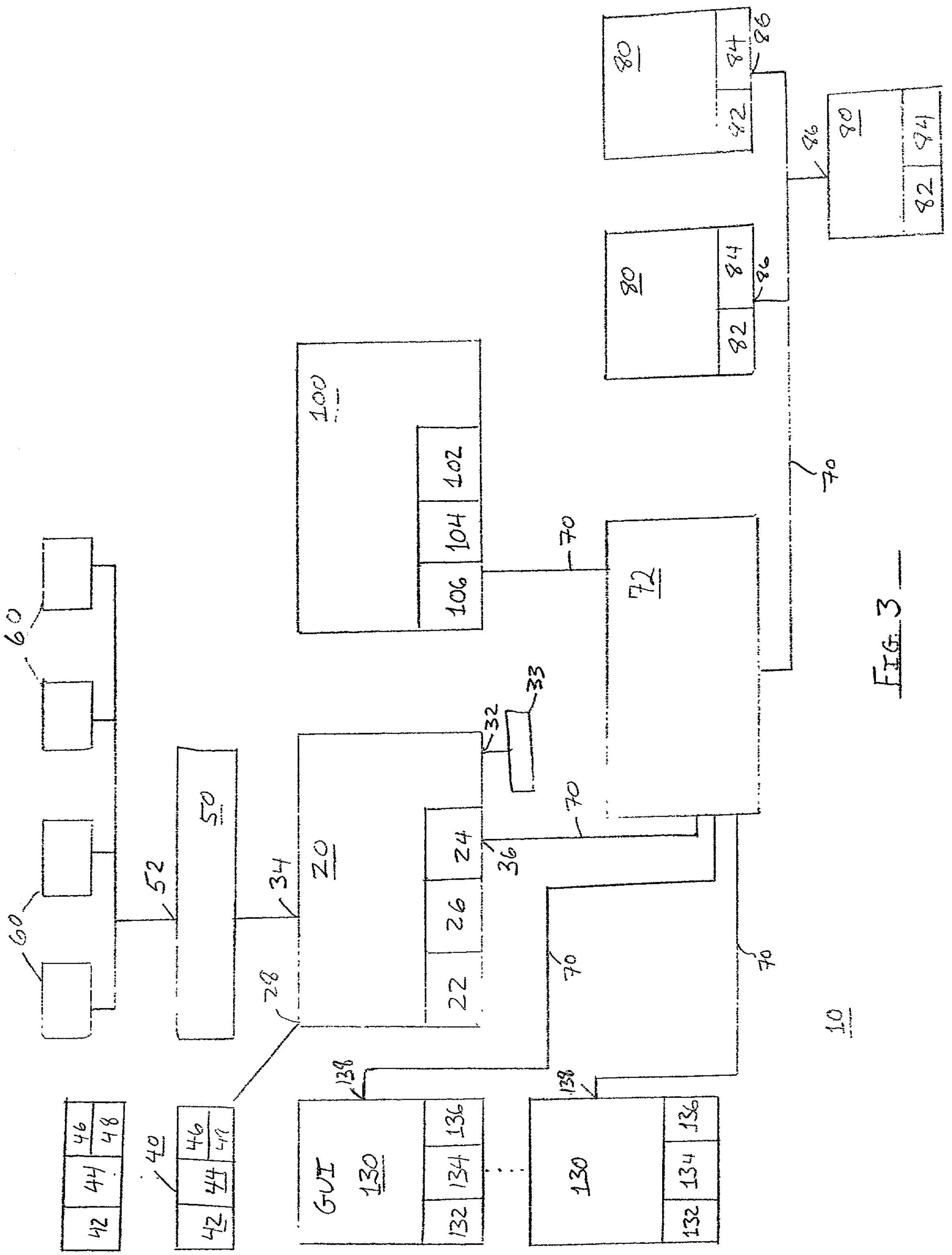
FIG. 3—is a block diagram of the system of the instant invention.

In one alternative embodiment of the instant invention, as shown in FIG. 3, at least one graphical user interface (GUI) microcomputer 130 having a keyboard/mouse 132 and monitor 134 is further provided in conjunction with the central computer 20 as a means for an operator to configure and use the system of the instant invention. The graphical user interface 130 may also be provided with a microphone 136 to enable an operator to record audio messages as described in greater detail below, a communications port 138, as described further below.

In one embodiment of the instant invention, the microphone station 40 is provided with a keypad 42 for supplying alphanumeric information to the central computer 20, and an associated user display 44, for example a liquid crystal or LED display. The microphone station 40 may further comprise a conventional microprocessor 46 and system memory 48, as is well known to one of ordinary skill in the art. Series 500 and 508 microphone stations as produced by Innovative Electronic Designs Inc. of Jeffersontown, Ky. are particularly suited for use as microphone stations with the system of the instant invention.

Additionally, the central computer 20 has an input 32 connected to the output of a conventional keyboard 33 thereby allowing a text message to be typed directly into the central computer 20 for eventual audio and visual broadcast, as will be described in detail below. The central computer 20 is further equipped with at least one audio output 34 electrically connected to at least one power amplifier 50. The power amplifier 50 has a plurality of audio output channels 52 capable of supplying an electrical signal representative of an audio stream. The output channels 52 are electrically connected to a plurality of audio reproduction devices 60, for example conventional loudspeakers.

Furthermore, the central computer 20 is equipped with a communications port 36 connected to a communications network bus 70. While the preferred constructed embodiment of the instant invention employs an Ethernet communications bus connected to at least one Ethernet switching device 72, for example a 900 Netswitch™ for routing communications signals to a plurality of Ethernet compatible devices connected to said bus 70, one of ordinary skill in the art will comprehend that a wide variety of communications protocols and networks may be employed in the practice of the instant invention, without departing from the scope thereof.

A plurality of visual display devices 80 are provided, each having a microprocessor 82 and a system memory 84 therein. In a constructed embodiment of the instant invention an NEC™ plasma display capable of displaying text in a 16:9 aspect ratio with a vertical pixel count of 480 lines is employed as a visual display 80, although many alternatives thereto are well known to one of ordinary skill in the art. Each visual display device 80 further comprises a communications port 86 connected to the communications bus so that the plurality of display devices can be addressed separately by the central computer 20. Multiple network switching devices 72 may be coupled together via multi-mode fiber optic cabling or its equivalent to allow for the use of a greater number of displays 80 in the system 10. The video display devices 80 may be suitably programmed to enable them to display visual messages in a specified format or formats, as will be explained in greater detail below.

The system 10 of the instant invention further includes a visual display server computer 100 for storing and retrieving components of visual messages. The visual display server comprises a conventional microprocessor 102, system memory 104, and a communications port 106 connected to the communications bus 70. In an alternative embodiment of the instant invention as shown in FIG. 2, at least one database 120 server having a communications port 122 connected to the communications bus 70 provides system 10 access to additional stored information that may be desirable to display. Both the visual display server 100 and the at least one database server 120 may be accessed by other devices on the communications bus 70, as is well known to one of ordinary skill in the art.

For example, in an airport application, the at least one database server 120 may contain a plurality of data tables 124, known as a flight information database, for storing flight information such as arrival and departure times, gate locations, flight numbers, baggage check locations for arriving flights, and other pertinent data. The central computer 20 may then access this information as required to construct or build messages. Visual displays 80 that are dedicated to the dissemination and display of flight information (Flight Information Displays, or FIDS) are readily updated with new information using the system and method of the instant invention. When the flight information database is updated, the visual displays 80 are able to immediately access any changes thereto via the communications bus 70.

In an alternative embodiment of the instant invention, the plurality of data tables 124 are copied and stored in the central computer 20 memory 24. Any changes to the data tables 124 made in the central computer 20 may then be copied directly to the corresponding tables 124 on the server 120 as necessary to update the server 120.

Typically, updated information about flight arrivals and departures is first known by the agents working at a gate. Using a one of the plurality of microphone stations 40, an agent or user can enter numeric or alphanumeric codes representative of specific message types to be broadcast, and then specify any message variables needed to complete the message, for instance gate numbers, flight numbers, arrival and departure times, and flight status. The microphone station 40 display 44 will then prompt the user to enter information necessary to complete the message type. As one example, an alphanumeric code sequence is entered via the microphone station 40 that denotes a flight boarding call. The display 44 then prompts the user (agent) to enter the flight number, the boarding time, and the gate location, or other message components that vary from message to message, as will be described in greater detail below.

The central computer 20 memory 24 contains a plurality of digital audio "take" files that are made by recording words and phrases in a digital audio format by using the graphical user interface 130 microphone 136. These words and phrases comprise a "take" and are each assigned a unique number or tag for easy retrieval. Each take is then translated into text and stored as corresponding text files along with the unique tag in the visual display server 100.

When the central computer 20 receives a predetermined alphanumeric code from the microphone station 40, it assembles a message by accessing and arranging a plurality of the pre-recorded audio take files in a predetermined order. The data is entered using the microphone station 40 is translated into a message play list by the central computer 20. A message play list is a list of audio file takes and text file takes that comprise a complete message. The central computer 20 creates an assembled audio message by selecting from the plurality of the pre-recorded takes based on the audio file takes listed in the message play list. The central computer 20 transmits the text file takes in the message play list to the display server 100, which then assembles a complete text message by selecting the corresponding pre-defined text takes therein. When the audio message is broadcast, the display server 100 simultaneously sends the completed text message to the plurality of display devices 80 to display.

Figure 4:
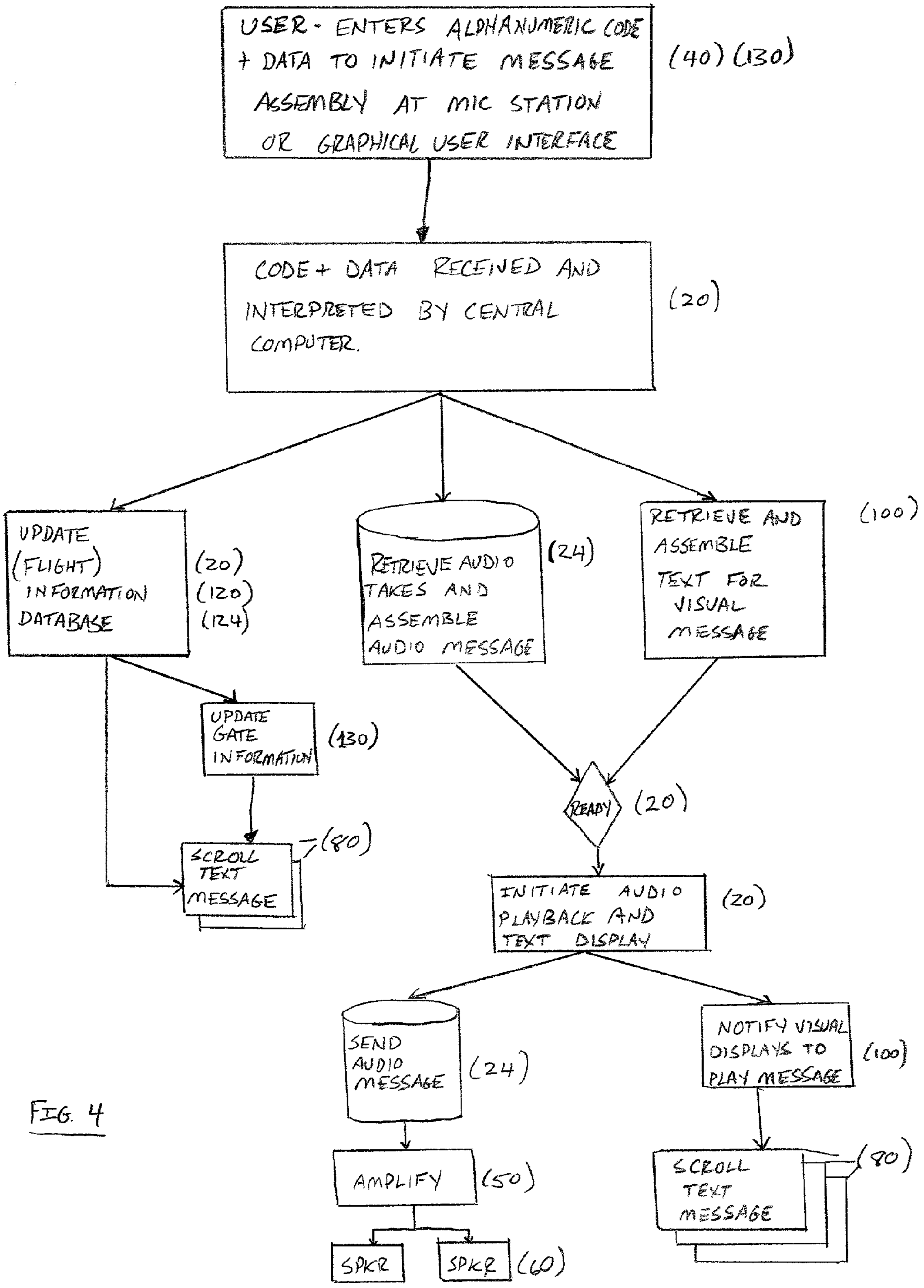
FIG. 4—is a block diagram of the audio and video assembly process in accordance with the instant invention.

Referring to FIG. 4, and in accordance with the instant invention, an exemplary message assembly process is initiated when a user enters a predetermined alphanumeric code sequence and other required message data at a microphone station 40, or alternatively, using the graphical operator interface 130. The predetermined code can be selected as required by a user to represent one of a plurality of different message types. As an example of an assigned message code in an airport application, an arrival and departure pair of announcement sequences may be initiated by entering the keystrokes "1301" followed by the arrival flight number, departing flight number, gate number, and optional arrival and departure times for the flights. Additional message in the message sequence may be added by entering an pre-selected alphanumeric code (for example a "6") while and additional pre-selected code (for example "7") may operate to add a departure or boarding announcement message in the sequence.

Referring to the example of a flight boarding sequence the user (in this example a gate agent) enters the predetermined code sequence and is prompted by the microphone station 40 display 44 to enter any additional data necessary to complete the message assembly, as will be explained in greater detail below. The user would enter the flight number and gate number as data variables to complete the message content. The code and data are then read and interpreted by the central computer 20, to determine what audio takes must be retrieved to construct the required message sequence.

For a boarding sequence the central computer 20 constructs a plurality of messages to be broadcast sequentially beginning with, for example: "Flight XXX to CITY is now pre-boarding at gate Y. Passengers with small children or those needing special assistance may now board." The central computer then constructs additional messages such as: "Flight XXX to CITY is now boarding rows A and higher at gate Y.", and so on, until all rows of the aircraft are boarded for a given flight, depending upon the aircraft type. In this example, the variables XXX denoting the flight number, and Y denoting the gate number are entered by the user when initiating the message.

In one embodiment of the instant invention, the central computer 20 is sent any updated information from the database server 120 (which in the present example would comprise flight information data) to determine the gate number, city, and type of aircraft for a given flight. This information then dictates how many boarding messages are to be assembled and broadcast, depending upon the number of rows of seats in the aircraft being boarded. The central computer 20 then assembles the messages by first locating and retrieving from memory 24 the audio take file for "Flight", then the audio take files representing the number flight number "XXX" (for example "742" requires the audio takes "seven" and "forty-two" to be located and retrieved) then the audio take file for "to", then the audio take file for the destination city, then the audio take file for "is now boarding at gate", then the audio take file for the gate number "Y", and so on, thereby compiling a list of audio take files to be played in order for eventual broadcast. The visual display server 100 assembles corresponding text messages by simply copying the contents of each take file indicated in the text message play list sent by the central computer 20 and sends the text messages to the plurality of display devices 80, where any necessary time queues are inserted prior to playback, as will be discussed further below.

Once the required messages are assembled, a "ready" signal is sent from the visual display server 100 to the central computer 20 whereupon audio and visual playback is initiated by the central computer 20. The computer 20 sends the digital audio take files to a conventional digital to analog converter where the resulting analog signal is routed through an output 34 to be played through the amplifier 50, and simultaneously sends a "notify displays" signal to the visual display server 100. The display server 100 then notifies the plurality of displays 80 to initiate the display and scrolling of the visual message or messages. The amplifier 50 then amplifies the audio signal and outputs a plurality of audio signals to playback the audio message through the plurality of speakers 60. Using the method described above, the system 10 of the instant invention can be used to transmit, both audibly and visually, the latest flight information to any given display 80 throughout a building almost immediately.

Figure 5:
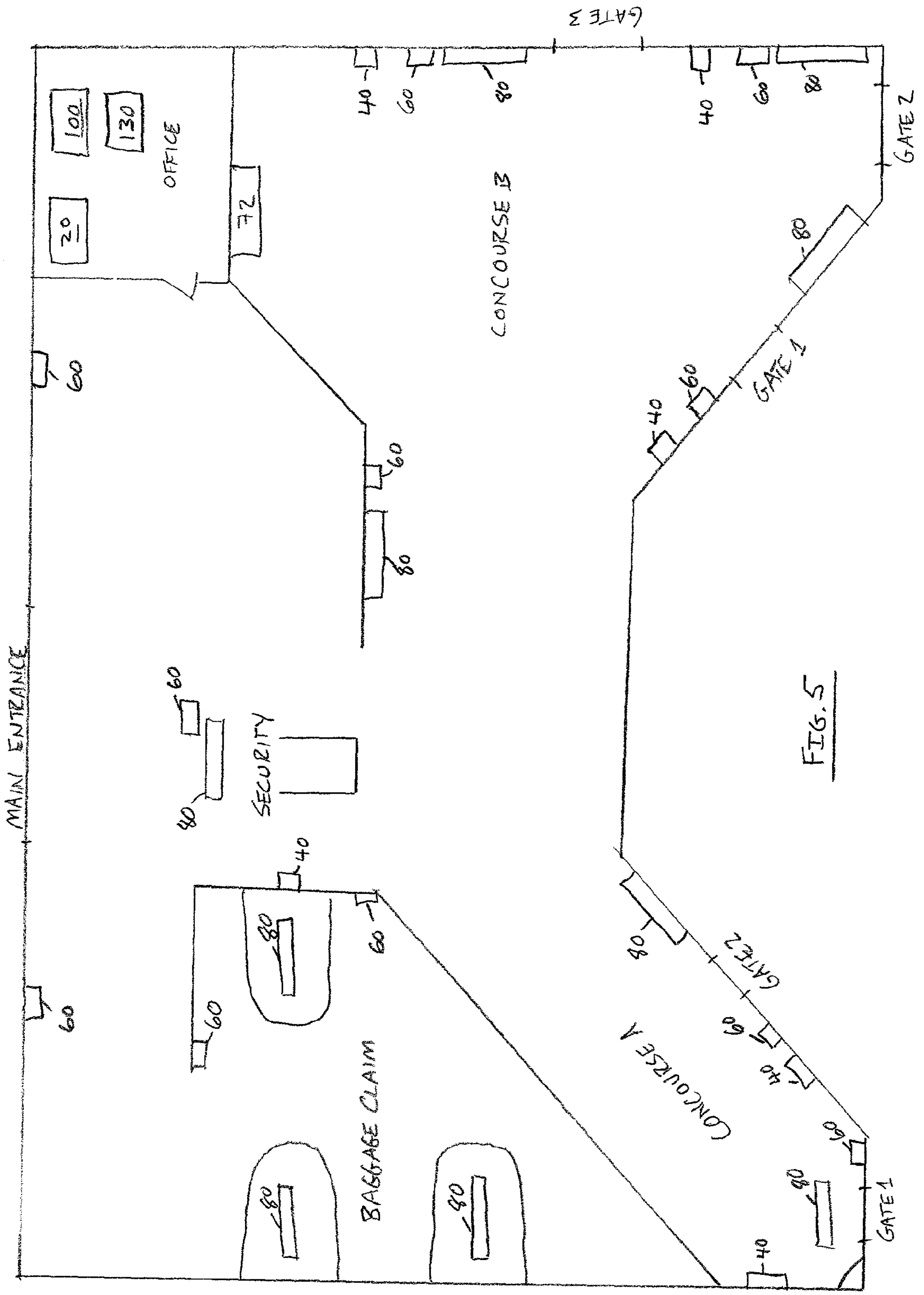
FIG. 5 is a diagram of the location of the elements of the instant invention in an airport environment.

Referring to FIG. 5, a plurality of alphanumeric codes entered using the microphone station 40 can be used to instruct the central computer 20 to broadcast a message to a predetermined area or broadcast zone in a facility. For example, one code may indicate that a message be broadcast locally, i.e., in the immediate vicinity or at a particular gate or gates in an airport or terminal. A predetermined message initiation code entered using the microphone station 40 can be assigned to instruct the central computer 20 to broadcast a message to all locations in the facility, for example in the event of the need to convey emergency information.

A particular facility or area can be divided into a plurality of broadcast zones, and broadcast zones can be tailored to the message content, thereby obviating the need to broadcast incessant and perhaps unnecessary messages to all zones. Furthermore, this feature of the instant invention allows for information to be broadcast to virtually any location within a facility from any microphone station 40 without requiring that the message be entered either at a central location or at the broadcast location.

Accordingly, in one embodiment of the instant invention, a message may be designated to play back at specified visual displays 80 and speakers 60 located at a plurality of locations throughout a facility. For example, a flight boarding sequence may be broadcast only to those speakers 60 and displays 80 proximate the boarding gate, or in the entire concourse. The central computer 20 simply specifies the network addresses of devices to display a particular message, and the necessary output channels 52 for the desired speakers 60. The required network addresses are sent from the central computer 20 with the assembled message components.

Yet another feature of the instant invention is the ability of the central computer 20 to synchronize the audio and visual portions of messages to be broadcast whereby a text message is scrolled at a variable rate on a visual display 80 in concert with a corresponding audio message broadcast. This feature of the invention allows for accurate synchronization of the audio and visual messages during playback. The amount of time required to play back each of the pre-recorded audio take files is timed by analyzing the length of the digital audio file and the playback rate for audio broadcasts. Once the duration for each audio take file is established, said time duration is embedded in each corresponding visual text file. The visual text files are resident on the visual server display 100.

When a user desires to broadcast a message, the predetermined message code and a plurality of message variables are entered using the aforementioned microphone station 40, then transmitted to the central computer 20. This broadcast message can then be assembled from a plurality of pre-recorded takes by the central computer 20. For example, if the text message is "Flight number six-twenty-seven is now boarding at gate 12.", the central computer 20 first combines a plurality of audio take files to assemble the message to be broadcast. First the pre-recorded take-file "Flight number" is searched for and retrieved, then the take-file "six", then "twenty-seven", and so on, until the entire message is constructed from a plurality of pre-recorded audio take-files. The central computer 20 then makes a list of the takes required (by unique tag number) to broadcast the message.

Once the audio take list is compiled for broadcast, a corresponding list of visual takes is assembled, again by unique tag number. The visual take list is then transmitted by the central computer 20 to the display server 100, where it is stored. In a preferred embodiment of the instant invention, each visual take is assigned a unique number whereby each of the unique numbers corresponds to the visual take file stored on the visual display server 100. This allows all visual information to be displayed to be stored only on the visual display server 100, thereby allowing for more economical and efficient transmission of information on the communications bus 70.

Once the list of take numbers is sent to the visual display server 100, the server 100 assembles the actual text to be displayed from the stored digital text files using the take list, and then inserts any required timing queues necessary to allow the broadcast visual message to be displayed in a fashion that mimics the rhythm of conversational speech. The visual display server 100 then sends the text message to be displayed to a plurality of visual displays 80.

The individual displays 80 individually determine how to separate the text message components into a plurality of lines to scroll on the display 80, the length of which is determined by the aspect ratio of each display 80 and the number of display lines available. Note that the number of display lines will vary depending upon the required text size, which may be configured by a user. Once the message is broken into a plurality of displayed lines, the amount of time required to audibly broadcast each line is computed by simply summing the embedded time queues, and a scroll rate for each line is calculated individually by each display 80. In this fashion, each line of text to be displayed may have a different scroll rate down the specific display 80, depending upon the total time required for that line, and each display 80 may employ different scroll rates. The text is displayed such that the audio being broadcast corresponds to the line located in the vertical center of the display screen.

In one embodiment of the instant invention, the list of takes is sent from the central computer 20 to the visual display server 100 as a 'deferred' message whereby the individual displays will perform the aforementioned scroll rate calculations then wait to display the message until prompted to do so by the central computer 20. The visual display server 100 transmits the text message stream to the desired display or displays 80 and then awaits further instruction. The central computer 20 thence activates the audio portion of the announcement by transmitting a signal representative of the announcement to the amplifier 50, and then sends a "commence display" command to the display server 100 to immediately display the message at the plurality of displays 80. This feature of the instant invention ensures that there is no time lag caused by the display calculations taking place in the visual displays 80.

It should be noted that the instant invention is capable of assembling and broadcasting a plurality of different message types dictated by the needs of a given broadcast application. In the aforementioned airport application message types or templates can include, but are not limited to the following: final boarding call, gate change, ready for boarding, second boarding call, cancelled flight (with or without an accompanying explanation), snack service on flight, no smoking flight, carry-on item announcements, on time departure, pre-boarding for children and passengers needing special attention, flight over-booked, aircraft change, gate change (arrival or departure), delayed arrival time, on-time arrival, boarding by specified row numbers, boarding instructions, continued boarding by row, baggage claim with welcome, delayed baggage, carousel change, flight cancellation, apology for delay, baggage available at carousel, overnight delay of flight, delayed departure with expected time, or any other necessary user configured message.

In one embodiment of the instant invention, the user inputs a plurality of flight specific variables into the central computer 20 by using the microphone station 40 keypad 42 to initiate the automated assembly and broadcast of a series of related messages. As one example, flight boarding sequences are readily generated using the present invention. When a flight is ready to board, the gate agent uses the microphone station keypad to input a code indicating a flight boarding sequence and a flight number to initiate the boarding message sequence. Once the sequence is initiated, the control computer 20 generates and plays future boarding announcements one a timed schedule based upon the type of aircraft being boarded. If the flight number entered is a plane having N rows of seats, the central computer 20 would initially generate and broadcast a first audio and visual message for boarding first class passengers and those needing special assistance, wait for a predetermined time, generate a second announcement for boarding rows N-10 and higher, wait for a predetermined time, then generate a remaining announcement or announcements for boarding the remaining rows as necessary, and lastly generate a final boarding call announcement. The gate agent has no need to supply input to the system 10 to generate all boarding announcements for a given flight. If needed, the agent can halt the boarding sequence simply by supplying an interrupt code to the central computer 20, then continue when ready. The agent may also skip or repeat messages by simply entering a predetermined command code using the microphone station 40. This feature of the invention allows an agent to focus on other tasks such as checking baggage, verifying passenger identification, issuing boarding passes, taking tickets, and answering questions, thereby facilitating prompt departures.

Security announcements may also be constructed in automated announcement sequences for broadcast in certain zones of an airport facility. For example, at the security gates prior to entering a concourse, a plurality of displays 80 and speakers 60 are arranged to continuously broadcast security related information to passengers entering the security checks. Messages such as “Place all bags flat on the belt”, and “Please remove all metal items from your pockets and place them in the trays provided prior to entering the metal detectors” can be continuously broadcast in the areas proximate to the security checkpoints to alert all passengers to the procedures to be followed. The present invention allows continuous broadcast in predetermined zones while providing the ability to simultaneously broadcast other messages to different broadcast zones within the same facility.

Another feature of the instant invention allows specific display of flight information based on a particular display’s proximity to a specific gate or gates. All ‘gate’ displays 80 are configured to constantly display flight arrival and departure information specific to that gate on a portion of the gate display dedicated to gate-specific information. The central computer 20 periodically accesses the data tables 124 to determine the current information for each gate, and sends all the data relevant thereto a particular gate to the display server 100 along with the network addresses of the displays proximate that gate, which then passes the information to the specific display or displays covering that gate. This feature of the instant invention is also readily adapted for use at baggage claims, train terminals, bus stations, and other public venues where schedules must be regularly updated to inform the public.

In one embodiment of the instant invention, a graphical user interface 130 is employed as a courtesy announcement system. When a user wishes to broadcast an announcement throughout a facility, the announcement text may be typed into the user interface 130 via the keyboard 132, while the concomitant audio may be recorded using the microphone 136, thence saved as digital audio and text files in the central computer. The recorded message can then be broadcast to any specified zone or zones as previously described. Furthermore, the graphical user interface 130 can be employed to store a list or log of announcements recorded and played in this fashion. This feature of the instant invention is particularly useful for paging people in a given facility since the pages can be broadcast to all zones, and a computer record of each page is maintained.

The foregoing detailed description of the preferred embodiments is considered as illustrative only of the principles of the invention. Since the instant invention is susceptible of numerous changes and modifications by those of ordinary skill in the art, the invention is not limited to the exact construction and operation shown and described, and accordingly, all such suitable changes so or modifications in structure or operation which may be resorted to are intended to fall within the scope of the claimed invention.

We claim:

1. A method for broadcasting synchronized audio and corresponding visual text information comprising the steps of:

providing a computer for recording audio message components input from a sound transducer and corresponding text message components input from a user interface, and storing said message components in said information database;

assembling audio and corresponding text messages for broadcast by ordering said audio message components and said text message components in said information database in a predetermined sequence;

providing at least one audio reproduction device for broadcasting audio messages;

providing at least one visual display device for broadcasting text messages;

calculating a duration for each audio message component;

embedding the time duration of each audio message component into the corresponding text message component;

for each of said at least one visual display device, separating said text messages into a plurality of lines;

synchronizing the broadcast of said text messages with said audio messages by calculating a scroll rate for each line for said text messages on said at least one visual display device using the embedded time duration of each corresponding audio message component; and broadcasting said audio and text messages over said at least one audio reproduction device and said at least one visual display device, whereby said text messages are scrolled at a variable rate in concert with said audio messages.

2. A method for broadcasting synchronized audio and corresponding visual text information as claimed in claim 1 further comprising the steps of:

supplying a message type code from said user interface to said computer, said message type code representative of a predetermined message sequence to be broadcast; and supplying a plurality of message variables relevant to the message sequence to be broadcast.

3. A method for broadcasting synchronized audio and corresponding visual text information as claimed in claim 1 wherein said step of broadcasting said audio and text messages over said at least one audio reproduction device and said at least one visual display device further includes selecting a predetermined broadcast zone to which said audio and text messages are broadcast.

4. A method for broadcasting synchronized audio and corresponding visual text information as claimed in claim 1 wherein the step of assembling messages for broadcast further comprises the steps of:

assigning a unique identification tag to each audio message component and each text message component; and compiling a list of the audio message components and text message components by unique identification tag.

5. A method for broadcasting synchronized audio and corresponding visual text information as claimed in claim 1, where, for each audio and corresponding text message broadcast, the text is displayed such that the text line in the vertical center of the visual display device corresponds to the audio being broadcast.

6. A method for broadcasting synchronized audio and corresponding visual text information comprising the steps of:

a. storing a plurality of pre-recorded audio take files, each audio take file being identified by a unique tag, each audio take file including an embedded time queue identifying the length of time for broadcast of that audio take file; and storing a plurality of corresponding visual text files, each corresponding text file being identified by the corresponding audio take file unique tag;

b. identifying to a central computer a specific message to be broadcast and displayed;

c. assembling the audio portion of the specific message to be broadcast by having the central computer combine the required pre-recorded stored audio take files in sequence and generate an audio take list containing the corresponding unique tags in sequence for the specific message to be broadcast;

d. transmitting the audio take list to a visual display computer;

e. assembling by said visual display computer the text portion of the specific message to be displayed from the audio take list by combining the required stored visual text files in sequence;

f. transmitting the text portion of the specific message to be displayed to at least one visual display, each said visual display having a microprocessor;

g. separating by the microprocessor in each of said visual displays receiving the transmitted text portion the text portion of the specific message to be displayed into a plurality of lines to scroll on that specific visual display and, for each line of said plurality of lines, for the audio take files corresponding to the visual text files on that line, summing the embedded time queue for that line and determining a scroll rate for that line;

h. transmitting by said central computer said audio portion of the specific message to be broadcast to at least one audio reproduction device and transmitting to said visual display computer acommand to direct each of said visual displays receiving the transmitted text portion to display said text portion of the specific message to be displayed using the determined scroll rate for each line of text to scroll at a variable rate so that the audio portion and corresponding text portion are synchronized such that an observer would simultaneously hear the audio portion and see the corresponding text portion.

7. The method for broadcasting synchronized audio and corresponding visual text information of claim 6, where said at least one visual display comprises a plurality of visual displays with each said visual display being associated with at least one of said at least one audio reproduction device and, in step h, the transmitting by said central computer is to a selected set of said at least one audio reproduction devices and the transmitting to said visual display computer the command directs those visual displays to display the text portion which are associated with those audio reproduction devices in the set receiving the audio portion.

8. The method for broadcasting synchronized audio and corresponding visual text information of claim 7, where each of said plurality of visual displays and the audio reproduction devices associated therewith are included in one or more broadcast zones and, in step h, the transmitting by said central computer is to a selected set of said at least one audio reproduction devices and the transmitting to said visual display computer the command directs those visual displays to display the text portion which are associated with those audio reproduction devices in the set receiving the audio portion results in the specific message to be broadcast and displayed being broadcast and displayed in one or more of said broadcast zones.

9. The method for broadcasting synchronized audio and corresponding visual text information of claim 8, where the specific message to be broadcast and displayed identified to said central computer comprises a plurality of related messages to be broadcast and displayed in a timed sequence controlled by said central computer.

10. The method for broadcasting synchronized audio and corresponding visual text information of claim 9, where the time controlled sequence can be altered and where any of said plurality of related messages can be skipped and where any of said plurality of related messages can be repeated.

11. The method for broadcasting synchronized audio and corresponding visual text information of claim 6, where the specific message to be broadcast and displayed identified to said central computer comprises a plurality of related messages to be broadcast and displayed in a timed sequence controlled by said central computer.

12. The method for broadcasting synchronized audio and corresponding visual text information of claim 11, where the time controlled sequence can be altered and where any of said plurality of related messages can be skipped and where any of said plurality of related messages can be repeated.

13. The method for broadcasting synchronized audio and corresponding visual text information of claim 6, wherein the step of identifying to said central computer a specific message to be broadcast and displayed, the message to be broadcast and displayed is a message which can not be formed by assembling from the stored plurality of pre-recorded audio take files plurality of corresponding visual text files, such that the text of the specific message is typed into a user interface and the corresponding audio is spoken into a microphone and then displayed and broadcast.

14. A system for broadcasting synchronized audio and corresponding visual text information, comprising:

a. an input device;

b. a central computer in communication with said input device;

c. a visual display computer in communication with said central computer;

d. a plurality of visual displays in communication with said visual display computer, each said visual display having a microprocessor, each said visual display having at least one audio reproduction device associated therewith;

e. said central computer storing a plurality of pre-recorded audio take files, each audio take file being identified by a unique tag and including an embedded time queue identifying the length of time for broadcast of that audio take file and said visual display computer storing a plurality of corresponding visual text files, each corresponding text file being identified by the corresponding audio take file unique tag;

f. said central computer programmed to receive from said input, device identification of a specific message to be broadcast and displayed, said central computer assembling the audio portion of the specific message to be broadcast by combining the required pre-recorded stored audio take files in sequence and generating an audio take list containing the corresponding unique tags in sequence for the specific message to be broadcast; and said central computer transmitting the audio take list to said visual display computer;

g. said visual display computer assembling the text portion of the specific message to be displayed from the audio take list by combining the required stored visual text files in sequence and transmitting the text portion of the specific message to be displayed to at least one of the plurality of visual displays;

h. the microprocessor in each of said visual displays receiving the transmitted text portion separating the text portion of the specific message to be displayed into a plurality of lines to scroll on that specific visual display and, for each line of said plurality of lines, for the audio take files corresponding to the visual text files on that line, summing the embedded time queue for that line and determining a scroll rate for that line;

i. said central computer transmitting said audio portion of the specific message to be broadcast to any audio reproduction device associated with a visual display receiving the text portion and transmitting to said visual display computer a command to direct each of said visual displays receiving the transmitted text portion to display said text portion of the specific message to be displayed using the determined scroll rate for each line of text to scroll at a variable rate so that the audio portion and corresponding text portion are synchronized such that an observer would simultaneously hear the audio portion and see the corresponding text portion.

15. The system for broadcasting synchronized audio and corresponding visual text information of claim 14, where the specific message to be broadcast and displayed identified to said central computer comprises a plurality of related messages to be broadcast and displayed in a timed sequence controlled by said central computer.

16. The system for broadcasting synchronized audio and corresponding visual text information of claim 15, where the time controlled sequence can be altered and where any of said plurality of related messages can be skipped and where any of said plurality of related messages can be repeated.

17. The system for broadcasting synchronized audio and corresponding visual text information of claim 14, the input device can be used to input to said central computer a specific message to be broadcast and displayed which can not be formed by assembling from the stored plurality of pre-recorded audio take files plurality of corresponding visual text files, such that the text of the specific message is typed into the input device and the corresponding audio is spoken into the input device and then the specific message is subsequently displayed and broadcast.

18. The system for broadcasting synchronized audio and corresponding visual text information of claim 14, where each of said plurality of visual displays and the audio reproduction devices associated therewith are included in one or more broadcast zones and the specific message to be broadcast and displayed is broadcast and displayed in one or more of said broadcast zones.

* * * * *